E. S. WOODS, DEC'D.
A. G. WELCH, EXECUTOR.
ANTIFRICTION SIDE BEARING FOR RAILWAY CARS.
APPLICATION FILED JUNE 10, 1912.
1,187,692. Patented June 20, 1916.
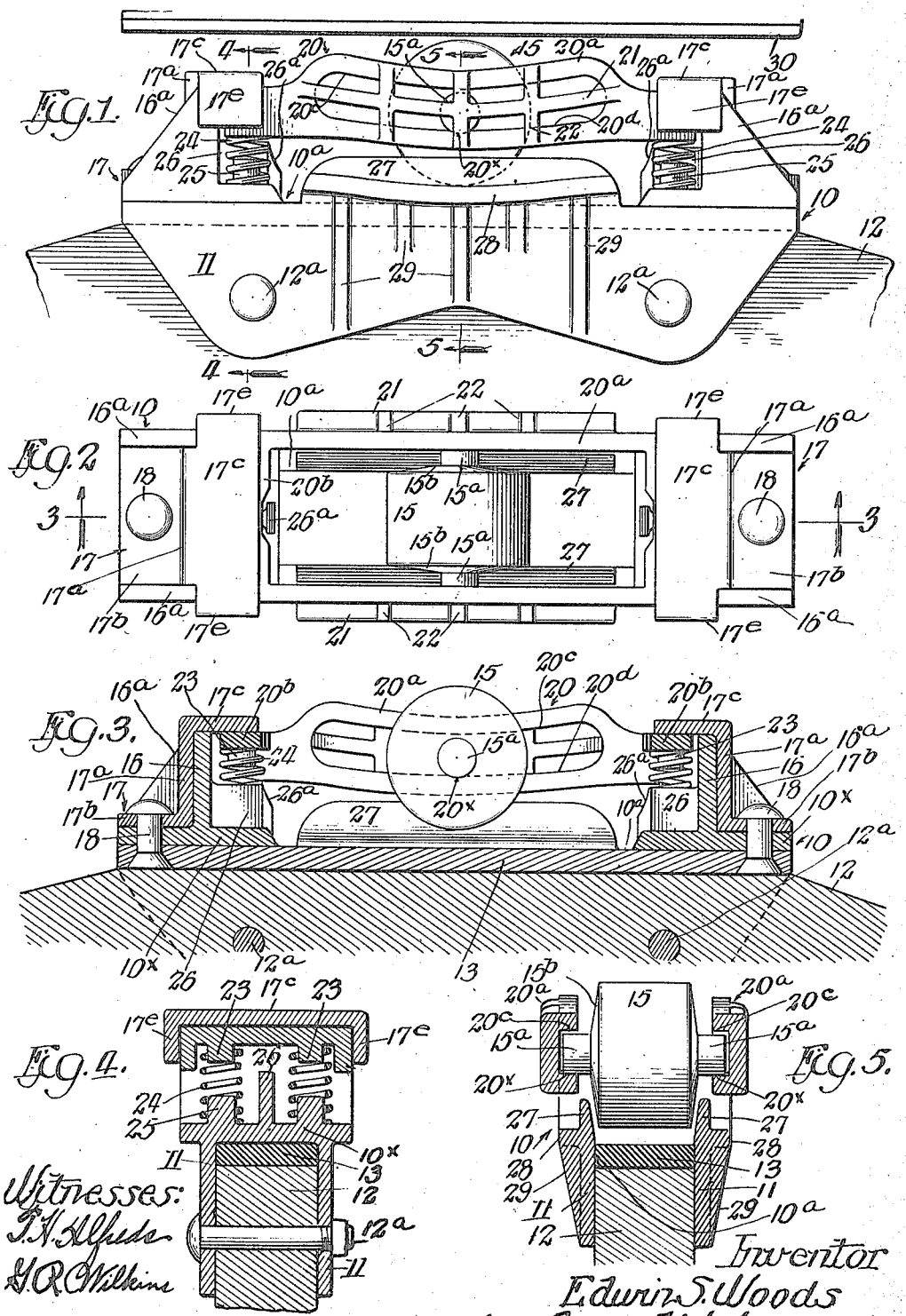

UNITED STATES PATENT OFFICE.

EDWIN S. WOODS, OF CHICAGO, ILLINOIS; ALBERT G. WELCH, EXECUTOR OF SAID WOODS, DECEASED, ASSIGNOR TO ALBERT G. WELCH, TRUSTEE.

ANTIFRICTION SIDE BEARING FOR RAILWAY-CARS.

1,187,692.  Specification of Letters Patent.  Patented June 20, 1916.

Application filed June 10, 1912. Serial No. 702,697.

*To all whom it may concern:*

Be it known that I, EDWIN S. WOODS, a citizen of the United States, and a resident of Chicago, in the county of Cook and State of Illinois, have invented certain new and useful Improvements in Antifriction Side Bearings for Railway-Cars; and I do hereby declare that the following is a full, clear, and exact description thereof, reference being had to the accompanying drawings, and to the letters of reference marked thereon, which form a part of this specification.

This invention relates to improvements in antifriction bearings for railroad cars and consists of certain novel features of construction hereinafter described and more particularly pointed out in the appended claims.

The bearing as shown in the drawings comprises a supporting member secured to the arch bar of the wheel truck and containing an antifriction roller adapted, when the bearing is transmitting load, to engage a wear plate located upon said arch bar and a bearing plate located upon the body bolster.

In the drawings:—Figure 1 is a view showing in side elevation a side bearing containing the novel features of my invention secured to the arch bar of a wheel truck. Fig. 2 is a top plan view of the side bearing. Fig. 3 is a view representing a longitudinal central section through the side bearing taken in a plane indicated by the line 3—3 of Fig. 2. Fig. 4 is a view representing a transverse section through the bearing in a plane indicated by the line 4—4 of Fig. 1. Fig. 5 is a view representing a transverse section through the bearing in a plane indicated by the line 5—5 of Fig. 1.

Referring now to that embodiment of my invention illustrated in the drawings, 10 represents a base plate having a longitudinally extending slot or opening $10^a$ intermediate its ends. $10^x$, $10^x$ indicate the end parts of said plate beyond said slot. Made integral with the plate 10 and projecting downwardly from its lateral margins are flanges 11, 11, which are adapted to embrace the side walls of the arch bar 12. The said plate 10 is attached to the arch bar 12 by bolts $12^a$, $12^a$, which pass through suitable openings in the said flanges 11, 11, and through corresponding openings in the arch bar.

13 indicates a wear plate which is interposed between the horizontal top surface of the arch bar and the under surface of the base plate 10, with its lateral margins engaged against the inner faces of the flanges 11, 11. The end parts of said wear plate are engaged and covered by the end parts $10^x$, $10^x$ of the plate 10, but the intermediate part of the wear plate is exposed by reason of the slot or opening $10^a$ in said plate and provides a bottom tread for an antifriction roller 15 that is held in suspended relation above the same in a manner presently to be described.

16, 16 indicate upright transverse flanges made rigid with and rising from the top of the base plate 10 and located near the ends thereof.

17, 17 indicate Z-shaped plates attached to the ends of the base-plate 10 and each comprises an upright part $17^a$ which engages against the outer face of one of the upright transverse flanges 16 of the base-plate; a lower horizontal part $17^b$ which rests upon the end part $10^x$ of the base plate, and an upper horizontal part $17^c$ which projects inwardly beyond the transverse flange 16, as clearly shown in Fig. 3. The said Z-shaped plates are attached to the base plate in any convenient manner and, as shown in the drawings, are attached by rivets 18 which extend through the lower horizontal parts $17^b$ of said Z-shaped plates, the base plate 10 and the wear plate 13. The base plate 10 is provided at each end with bracing ribs $16^a$ at each lateral margin which are made integral with the transverse end flanges 16 and engage the lateral edges of the horizontal lower part $17^b$ and the lateral edges of the upright part $17^a$ of said Z-plate. The upper horizontal parts of the Z-plates have lateral depending flanges $17^e$ which embrace the edges of the upright end flanges 16, 16 of the base plate.

The wear plate 11, the base-plate with its transverse end flanges 16, 16, and the Z-shaped plates 17, secured together, as described, constitute a casing which contains a yielding carriage or cage 20 that carries the antifriction roller 15. Said carriage 20 comprises lateral members $20^a$ and transverse end members $20^b$ which rigidly connect the ends of said lateral members and are adapted for thrust engagement against the under faces of the upper horizontal parts 17ᶜ of said Z-shaped plates. Said end members 20ᵇ of the carriage end plates have depending flanges 20ᵉ disposed at each side of the carriage and adapted for vertical guiding engagement with the flanges 17ᵉ of the said Z-shaped plates.

The anti-friction roller used in my improved construction has trunnions 15ᵃ, 15ᵃ, and preferably conical ends 15ᵇ, 15ᵇ. The lateral members 20ᵃ of the carriage are provided with elongated slots having upper sides 20ᶜ and lower sides 20ᵈ which form upper and lower rails for confining the trunnions 15ᵃ on the roller 15. Said rails are spaced apart a distance slightly greater than the diameter of the trunnions 15ᵃ and are curved, both preferably about the same center, in an upward direction each way from the center of the carriage 20. Each lower rail 20ᵈ is provided at a point intermediate its ends, preferably at its middle, with a depression 20ˣ adapted to receive the roller trunnions 15ᵃ so as to retain the roller at that point when free from load.

As shown each lateral member of the carriage has a rib 21 located between and extending parallel to the upper and lower rails 20ᶜ and 20ᵈ and a plurality of vertical ribs 22 extending transversely between said rails and serving to brace the said lateral members in the neighborhood of the slots between the rails.

At each end of the carriage on the transverse end plates 20ᵇ are formed laterally spaced depending studs 23 which are adapted for engagement within the upper ends of coiled springs 24. Said springs at their lower ends are engaged about laterally spaced upright studs 25, 25 rising from the end parts 10ˣ, 10ˣ of the base plate 10. The said studs 23 and 25 act to center the coiled springs and retain them in position and the said springs themselves tend to hold the end plates of the carriage in engagement against the under faces of the horizontal upper parts 17ᶜ of the Z-plates 17.

To provide stops to limit the movement of the anti-friction roller 15 toward either end of the casing, upright flanges 26, 26 are provided on the end parts 10ˣ of the base-plate 10, each flange rising from said end parts and being made integral with the inner faces of the upright flanges 16 and having laterally enlarged curved bearing surfaces 26ᵃ for engagement with the periphery of said roller. There are also provided on each side of the base-plate 10, adjacent the sides of the slot 10ᵃ therein, upright flanges 27 which have their inner faces inclined in a direction parallel to the conical ends 15ᵇ of the roller and adapted to take the end thrust of said roller. Longitudinal ribs 28 and vertical ribs 29 are preferably formed on the outer faces of said flanges 27 and of the flanges 11, 11, vertically below the same, for the purpose of providing a rigid structure.

A bearing plate 30 is secured to the body bolster of the car, the same being located in such a position as to have bearing engagement with the antifriction roller when said roller is transmitting load to the truck bolster.

The operation of my improved antifriction bearing is as follows: When the body bolster, in the vibration of the car, or when going about curves, approaches the truck bolster, it causes the bearing plate 30 to engage the top of the roller and bears down upon the roller so as to bring its lower side into contact with the wear plate 13 on the arch bar of the wheel truck. In this movement of the roller the carriage 20, by reason of the engagement of the trunnions 15ᵃ of said roller with the rails 20ᵈ thereof, is carried down with the roller against the upward action of the springs 24, said springs yielding in proportion to the relation that the distances between the central axis of said roller and the springs at each end of the casing bear to each other. As in the shifting movement of the body bolster with reference to the truck, the roller is caused to roll toward one or the other end of the casing, the springs at that end of the casing toward which the roller is rolling yield more and more. When the roller is released by reason of the rise of the truck bolster, the spring raises that end of the carriage toward which the roller has moved, so that when the upper side of the roller is released from contact with the bearing plate 30 on the truck bolster, said roller will roll on its trunnions toward the middle of the carriage and thus regain its central position therein.

One of the particular advantages of my improved side bearing is that when the anti-friction roller, by a comparatively small relative movement of the body bolster away from the truck bolster, is released from contact with the wear-plate on the truck-bolster it will still be held by the springs 24 in contact with the wear-plate on the body bolster and will thus be prevented from rolling from end to end of the casing and producing an objectionable rattling noise. My improved side bearing is thus superior in this respect to constructions heretofore used wherein, when the roller is released from contact with the upper bearing plate, but is still in contact with the lower bearing plate, the jarring of the car will cause it to roll on the lower wear-plate from end to end of the casing and thus rattle until such time as it is released from contact with both wear-plates. The importance of the present construction to prevent rattling in the case described will be realized when it is remembered that during a comparatively large part of the time, the antifriction roller, though not transmitting load, is still in contact with one of the wear-plates.

When in my present construction, by reason of a greater relative movement between said bolsters, the upper wear-plate moves to such a position that it does not contact with the top of the roller, the roller will be caused by gravity to seek its predetermined normal position, which, as shown, is a central position in its carrier. Then its trunnions will engage in the notches 20× and by such engagement will be held from movement that would cause it to rattle. Thus my improved bearing has the advantage of being noiseless under nearly all conditions.

I claim as my invention:—

1. In a side bearing, in combination with a casing adapted for attachment to a truck-bolster, a carrier vertically movable in said casing, said casing and said carrier being provided with engaging vertical guide flanges, means for limiting the upward movement of said carrier in said casing, resilient means interposed between said carrier and said casing to resist the downward movement of said carrier therein, a roller capable of longitudinal movement in said carrier and of limited vertical play therein, said roller being provided with trunnions having rolling bearing in said carrier, means for returning said roller to a predetermined point in said carrier when said roller is not transmitting load, and means for retaining said roller at said predetermined point in said carrier.

2. In a side bearing, in combination with a casing adapted for attachment to a truck-bolster, a carrier vertically movable in said casing, said casing and said carrier being provided with engaging vertical guide flanges, means for limiting the upward movement of said carrier in said casing, resilient means interposed between said carrier and said casing at points on either side of a predetermined point of said carrier to resist the downward movement of said carrier, a roller provided with trunnions supported by said carrier, said carrier having rails confining the trunnions of said roller, said trunnions being capable of limited vertical play between said rails, and means for returning said roller to said predetermined point in the carrier when said roller is free from load.

3. In a side bearing, in combination with a casing adapted for attachment to a truck-bolster, a carrier vertically movable in said casing, said casing and said carrier being provided with engaging vertical guide flanges, means for limiting the upward movement of said carrier in said casing, resilient means interposed between said carrier and said casing at points at either side of a predetermined point of said carrier to resist the downward movement of said carrier, a roller provided with trunnions supported by said carrier, said carrier having rails adapted for confining the trunnions of said roller and said rails being provided with depressions at said predetermined point, and means for returning said roller to said predetermined point when said roller is not transmitting load.

4. In a side bearing, in combination with a casing adapted for attachment to a truck-bolster, a carrier vertically movable in said casing, said casing and said carrier being provided with engaging vertical guide flanges, means for limiting the upward movement of said carrier in said casing, resilient means interposed between each end of said carrier and said casing to resist the downward movement of said carrier, a roller provided with trunnions supported by said carrier, said carrier having rails adapted for confining the trunnions of said roller, but permitting a limited vertical play of said trunnions, said rails being inclined upwardly in each direction from a point intermediate the ends of said carrier and having depressions at said intermediate point.

5. In a side bearing, in combination with a casing adapted for attachment to a truck-bolster, a carrier vertically movable in said casing, said casing and said carrier being provided with engaging vertical guide flanges, means for limiting the upward movement of said carrier in said casing, resilient means interposed between each end of said carrier and said casing to resist the downward movement of said carrier, a roller provided with trunnions supported by said carrier, said carrier having upper and lower rails for confining the trunnions of said roller, said rails being parallel and being inclined upwardly in each direction from a point intermediate the ends of said carrier and having depressions at said intermediate point, and said rails being spaced apart to permit a limited vertical play of said trunnions.

6. In a side bearing, in combination with a casing adapted for attachment to a truck-bolster, a carrier comprising an open elongated frame having slotted lateral members providing longitudinally extending rails and transverse end members, said casing and said carrier being provided with engaging vertical guide flanges, means providing transverse shoulders on said casing adapted for engagement against the ends of said carrier, resilient means adapted for holding the ends of said carrier in contact with the transverse shoulders of said casing, and a roller provided with trunnions which are confined between the rails of said carrier, said rails being curved in an upward direction from a point intermediate the ends of said carrier, and said rails being spaced apart to provide a limited vertical play of said trunnions between them.

7. In a side bearing, in combination with a casing adapted for attachment to a truck-bolster, said casing having a base-plate provided with an elongated slot intermediate its ends and with transverse upright flanges at each end beyond said slot, a wear-plate located below said base-plate, a carrier comprising an elongated frame open at top and bottom and having lateral members provided with elongated slots inclined upwardly in either direction from an intermediate point toward the ends of said carrier, said casing and said carrier being provided with engaging vertical guide flanges, means providing stops rigid with said casing against which the ends of said carrier have upward thrust bearing, resilient means interposed between the ends of said carrier and the base of said casing, and a roller provided with trunnions bearing within the slotted lateral members of said carrier, the slots in said lateral members providing for a limited vertical play of said trunnions therein.

8. In a side bearing, in combination with a casing comprising a base-plate having depending flanges at each lateral margin, an elongated longitudinally extending slot intermediate said lateral margins, and upright transverse flanges beyond the ends of said slot, a wear-plate located below said base-plate with its lateral edges engaged against the depending flanges of said base, a carrier comprising an elongated frame open at top and bottom and having lateral members provided with longitudinally extending slots inclined upwardly in either direction from an intermediate point toward the ends of said carrier, means providing stops rigid with the upper ends of said transverse flanges against which the ends of said carrier have upward thrust bearing, said casing and said carrier being provided with engaging vertical guide flanges, resilient means interposed between the ends of said carrier and the base-plate of said casing, and a roller provided with trunnions bearing within the slotted lateral members of said carrier.

9. In a side bearing, in combination with a casing adapted for attachment to a truck-bolster, a carrier, means provided for retaining said carrier in said casing, said casing and said carrier being provided with engaging vertical guide flanges, resilient means interposed between each end of said carrier and said casing, and a roller provided with trunnions supported by said carrier, said carrier having rails adapted for confining the trunnions of said roller, said rails permitting free longitudinal movement of said trunnions in said carrier and permitting a limited vertical play of said trunnions therein, means for returning said roller to a predetermined point intermediate its ends when said roller is not transmitting load and said casing having longitudinally extending upright lateral flanges to receive the end thrust of said roller.

In testimony, that I claim the foregoing as my invention I affix my signature in the presence of two witnesses, this 8th day of June, A. D. 1912.

EDWIN S. WOODS.

Witnesses:
G. R. WILKINS,
T. H. ALFREDS.